(12) United States Patent
Yan et al.

(10) Patent No.: US 11,926,537 B2
(45) Date of Patent: Mar. 12, 2024

(54) PREPARATION METHOD OF CROP STRAW-BASED SEAWATER DESALINATOR AND PRODUCT THEREOF

(71) Applicant: JIANGSU ACADEMY OF AGRICULTURAL SCIENCES, Nanjing (CN)

(72) Inventors: Nina Yan, Nanjing (CN); Lei Xu, Nanjing (CN); Zhiyu Zheng, Nanjing (CN); Jingwen Chen, Nanjing (CN); Xizhi Jiang, Nanjing (CN)

(73) Assignee: JIANGSU ACADEMY OF AGRICULTURAL SCIENCES, Nanjing (CN)

( * ) Notice: Subject to any disclaimer, the term of this patent is extended or adjusted under 35 U.S.C. 154(b) by 0 days.

(21) Appl. No.: 18/368,031

(22) Filed: Sep. 14, 2023

(65) Prior Publication Data
US 2024/0043287 A1    Feb. 8, 2024

Related U.S. Application Data

(63) Continuation of application No. PCT/CN2022/118696, filed on Sep. 14, 2022.

(51) Int. Cl.
*C02F 1/04* (2023.01)
*B01J 6/00* (2006.01)
*B01J 37/08* (2006.01)
*C02F 103/08* (2006.01)

(52) U.S. Cl.
CPC .............. *C02F 1/04* (2013.01); *B01J 6/001* (2013.01); *B01J 37/082* (2013.01); *B01J 37/08* (2013.01); *C02F 2103/08* (2013.01)

(58) Field of Classification Search
CPC .......... B01J 37/08; B01J 37/082; B01J 6/001; C02F 1/04
See application file for complete search history.

(56) References Cited

FOREIGN PATENT DOCUMENTS

| CN | 113307321 A | 8/2021 |
|---|---|---|
| WO | 2017136611 A1 | 8/2017 |

OTHER PUBLICATIONS

Xie Xiaoming, et al., Solar Steam Generation Performance of Corncob Biochar Cake and its Application in Water Treatment Transactions of the Chinese Society of Agricultural Engineering, vol. 38, Issue 10, p. 195-286 Publication date: May 23, 2022.
Chen Juan et al., Research on Corn Straw Briquette Binder of Low Metamorphic Pulverized Coals: China Coal, vol. 34, Issue 04, pp. 105-108 Publication date: Apr. 22, 2017.

*Primary Examiner* — Bradley R Spies
(74) *Attorney, Agent, or Firm* — CBM PATENT CONSULTING, LLC

(57) ABSTRACT

A preparation method of a crop straw-based seawater desalinator and a product thereof, and the preparation process is as follows: (1) crushing crop straws, and screening the crushed crop straws through a mesh sieve to obtain straw powder; (2) calcining the straw powder at a high temperature under nitrogen protection to obtain biochar, and then putting the biochar into a ball mill for ball milling to obtain ball-milled biochar; (3) adding the straw powder into a sodium hydroxide solution for reaction, and centrifuging a reactant to obtain a viscous product; and (4) stirring the viscous product uniformly with the ball-milled biochar to obtain a mixture, pouring the mixture into a mold, and freezing and drying the mixture to obtain a seawater desalinator. The evaporator features high evaporation rate and the photothermal conversion efficiency, and the ion concentration of the water body after evaporation is greatly reduced.

2 Claims, 3 Drawing Sheets

PREPARATION METHOD OF CROP STRAW-BASED SEAWATER DESALINATOR AND PRODUCT THEREOF

CROSS-REFERENCE TO RELATED APPLICATIONS

This application is the U.S. continuation application of International Application No. PCT/CN2022/118696 filed on 14 Sep. 2022 which designated the U.S. and claims priority to Chinese Application No. CN202210860453.6 filed on 21 Jul. 2022, the entire contents of each of which are hereby incorporated by reference.

TECHNICAL FIELD

The present disclosure relates to the technical field of material preparation, in particular to a preparation method of a crop straw-based seawater desalinator and a product thereof.

BACKGROUND

With the development of society, water resource shortage has occurred in many areas. Seawater desalination is considered as a powerful means to solve the shortage of water resources. In recent year, many scholars have been working on efficient seawater desalination devices. For example, the Chinese invention patent CN109589007 discloses a seawater desalination technology using metal nanoparticles-polymer composite material as a matrix, the technology uses metal nanoparticles as photothermal materials and polymer composite materials as carriers, for which an evaporation rate under one sunlight reaches about 1.4 kg m$^{-2}$ h$^{-1}$, and the energy conversion efficiency approximates to 80%. However, the technology is costly and the evaporation effect needs to be further improved.

Biomass is one of the most abundant resources in nature, and a seawater evaporation device prepared by biomass materials can not only fully utilize biomass resources, but also reduce material costs, thereby having great advantages. The Chinese invention patent discloses a synthetic biological pigment membrane seawater desalination device, which coats melanin material with extremely high photothermal conversion efficiency onto a cellulose membrane, enriches seawater in the cellulose membrane by utilizing capillary action of water delivery fibers, and when sunlight irradiates the cellulose membrane, a large amount of heat is generated due to high photothermal conversion efficiency of the melanin material, making the utilization rate of solar energy reach 88%, achieving the purpose of efficient seawater evaporation and obtaining fresh water. Although the technology utilizes cellulose as a matrix material to reduce costs, the production of the cellulose involves complicated steps such as separation and purification, as a result, its practical application is subject to some limitations.

Sun Zhuangzhi Research Team of Beijing Forestry University a method for making a high-efficiency solar evaporator from corn straws for seawater desalination, however, the method directly covers the complete corn straws with a coating to make a seawater desalination device, which is impossible for mass production, while the preparation by using straw powder is simpler and easier to obtain.

Evaporators reported so far either has good performance but high cost and complex preparation, or low costs but poor performance, both of which are difficult to put into practical application. In summary, there is an urgent need for a simple and efficient seawater evaporation technology, therefore, the preparation of a low-cost and high-efficiency evaporator by using the biomass material has bright development prospects.

SUMMARY

Objectives of the present disclosure: a first objective of the present disclosure is to provide a crop straw-based seawater desalinator, which has a relatively high evaporation rate and photothermal conversion efficiency.

A second objective of the present disclosure is to provide a preparation method of a crop straw-based seawater desalinator, which has the advantages of easily available raw materials, low cost and simple preparation process and capable of being used for mass production.

Technical solution: the present disclosure discloses a crop straw-based seawater desalinator and product thereof, including the following steps:
(1) crushing crop straws, and screening the crushed crop straws through a mesh sieve to obtain straw powder;
(2) calcining the straw powder obtained in the step (1) at a high temperature under nitrogen protection to obtain biochar, and then putting the biochar into a ball mill for ball milling to obtain ball-milled biochar;
(3) adding the straw powder obtained in the step (1) into a sodium hydroxide solution for reaction, and centrifuging a reactant to obtain a viscous product at the lower layer; and
(4) stirring the viscous product obtained in the step (3) uniformly with the ball-milled biochar obtained in the step (2) to obtain a mixture, pouring the mixture into a mold, and freezing and drying the mixture to obtain a seawater desalinator.

Preferably, the crop in the step (1) is one or more of corn, wheat, sorghum, rice and rape.

Preferably, calcining conditions in the step (2) are: rapid heating to 300-850° C. at a heating rate of 1-5° C./min and heat preservation for 2-5 h.

Further preferably, calcining conditions in the step (2) are: rapid heating to 450° C. at a heating rate of 5° C./min and heat preservation for 5 h.

Preferably, the straw powder in the step (2) needs to be cooled to 10-30° C. after being calcined at high temperature, and is screened by a 100-200 mesh sieve.

Further preferably, the straw powder in the step (2) needs to be cooled to 25° C. after being calcined at high temperature, and is screened by a 200 mesh sieve.

Preferably, zirconia balls used as milling media in the step (2) have a diameter of 2-10 mm and the number of 10-50.

Further preferably, zirconia balls used as milling media in the step (2) have a diameter of 2 mm, 8 mm and 10 mm, and the numbers ratio being 42:4:2.

Preferably, the ball milling conditions in the step (2) are: a rotation speed of 100-500 rpm, and a ball milling time of 1-7 h.

Further preferably, the ball milling conditions in the step (2) are: a rotation speed of 500 rpm, and a ball milling time of 7 h.

Further preferably, the ball milling conditions in the step (2) are: a rotation speed of 200 rpm, and a ball milling time of 3 h.

Further preferably, the ball milling conditions in the step (2) are: a rotation speed of 100 rpm, and a ball milling time of 1 h.

Preferably, a mass ratio of the straw powder, to the sodium hydroxide solution and to the ball-milling biochar is 10:10-1000:0.1-3.

Further preferably, a mass ratio of the straw powder, to the sodium hydroxide solution and to the ball-milling biochar is 10:10:0.1.

Further preferably, a mass ratio of the straw powder, to the sodium hydroxide solution and to the ball-milling biochar is 10:100:2.

Further preferably, a mass ratio of the straw powder, to the sodium hydroxide solution and to the ball-milling biochar is 10:1000:3.

Preferably, a concentration of the sodium hydroxide solution in the step (3) is 1-30 wt %, mass is 10-1000 g, and the reaction conditions are: reaction 1-5 h at a temperature of 25-180° C.

Further preferably, a concentration of the sodium hydroxide solution in the step (3) is 1 wt %, mass is 10 g, and the reaction conditions are: reaction 3 h at a temperature of 80° C.

Further preferably, a concentration of the sodium hydroxide solution in the step (3) is 10 wt %, mass is 100 g, and the reaction conditions are: reaction 3 h at a temperature of 80° C.

Further preferably, a concentration of the sodium hydroxide solution in the step (3) is 30 wt %, mass is 10 g, and the reaction conditions are: reaction 1 h at a temperature of 25° C.

Further preferably, a concentration of the sodium hydroxide solution in the step (3) is 1 wt %, mass is 1000 g, and the reaction conditions are: reaction 3 h at a temperature of 80° C.

Preferably, a concentration of the sodium hydroxide solution in the step (3) is 10 wt %, mass is 200 g, and the reaction conditions are: reaction 5 h at a temperature of 180° C.

Preferably, the reactant centrifugation conditions in the step (3) are: centrifugation at a rotation speed of 1000-8000 rpm for 1-30 min.

Further preferably, the reactant centrifugation conditions in the step (3) are: centrifugation at a rotation speed of 8000 rpm for 20 min.

Further preferably, the reactant centrifugation conditions in the step (3) are: centrifugation at a rotation speed of 1000 rpm for 30 min.

Further preferably, the reactant centrifugation conditions in the step (3) are: centrifugation at a rotation speed of 5000 rpm for 1 min.

Preferably, in the step (4), the mixture is frozen at a temperature of −3-−5° C. for 2-6 h, and then dried at a temperature of −70-−90° C. for 3-24 h.

Further preferably, in the step (4), the mixture is frozen at a temperature of −4° C. for 6 h, and then dried at a temperature of −80° C. for 24 h.

A crop straw-based seawater desalinator, including the preparation method of any one of the above.

Beneficial effects: compared with the prior art, the present disclosure has the following obvious advantages: (1) good performance: the evaporation rate reaches 2.12 kg m$^{-2}$ h$^{-1}$, and the photothermal conversion efficiency reaches 94.2%, outperforming the effect reported by most of literature, and the ion concentration in the evaporated water is greatly reduced, thereby reaching the drinking standard. The evaporator not only has good desalting performance, but also has excellent stability; (2) low cost of raw material cost and simple preparation process: the raw material used for the evaporator is waste biomass, and the material cost is only $6.1/m$^2$, and the preparation does not involve complicated processing procedures, making the cost benefit (Rate/Price, g h$^{-1}$/$) reach an extremely high value of 348.

DETAILED DESCRIPTIONS OF THE EMBODIMENTS

Figure 1:
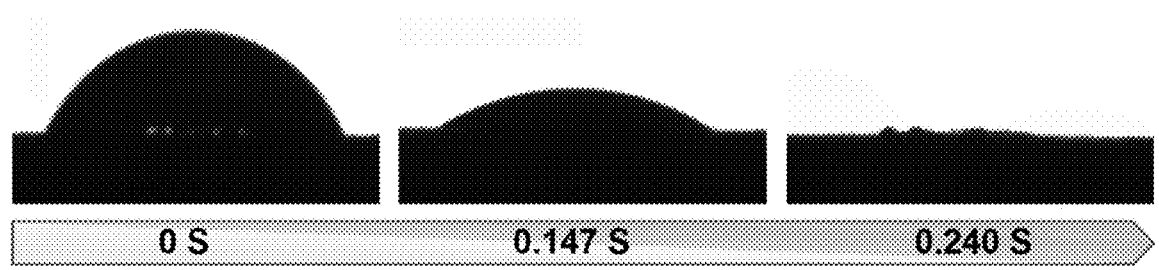
FIG. 1 shows the change of water contact angle of an evaporator prepared according to the present disclosure.

The technical solution of the present disclosure will be further described below with reference to the accompanying drawings.

Example 1 step 1, crop straws were crushed, and the crushed crop straws were screened through a mesh sieve to obtain straw powder;

step 2, the straw powder was put into a tube furnace, calcining the straw powder at a high temperature under the nitrogen protection, the straw powder was heated to 450° C. at a rate of 5° C./min, and the heat preservation was kept for 5 h. The straw powder was then naturally cooled down to 25° C., screened through a 200-mesh sieve, and put into a ball milling tank, 42, 4 and 2 zirconia balls with diameters of 2 mm, 8 mm and 10 mm was then put into the tank respectively, and ball milling was performed in a ball mill for 1 h with a rate of 100 rpm to obtain ball-milled biochar;

step 3, 10 g of the straw powder obtained in the step 1 was taken, 10 g of sodium hydroxide solution with a concentration was added to obtain a mixture, and the mixture was stirred for 3 h at a temperature of 80° C. to obtain a reactant; after the reactant was cooled, the reactant was poured into a centrifuge tube and centrifuged at a rotation speed of 8000 rpm for 20 min; then the viscous product at the lower layer was taken out; and step 4, the viscous product obtained in the step 3 was mixed with 0.1 g of the ball-milled biochar obtained in the step 2 to obtain a mixture, and the mixture was then stirred for 10 min at a rate of 100 rpm, and uniformly shaken before being put into a mold; and finally, the mixture was frozen in a refrigerator at a temperature of −4° C. for 6 h, and dried in a freeze dryer at a temperature of −80° C. for 24 h to obtain a straw-based evaporator with high porosity and good hydrophilicity. The evaporator was subjected to seawater evaporation test under simulated sunlight, and the evaporation rate of the evaporator was 1.19 kg m$^{-2}$ h$^{-1}$, and the energy conversion efficiency reached 40.2%.

Example 2

The preparation process is similar to that of Example 1, except that the ball milling conditions were 200 rpm for 3 h, the sodium hydroxide solution was used in an amount of 100 g and the concentration thereof was 10 wt %, and the viscous product was mixed with 2 g of ball-milled biochar. The evaporation rate of the prepared evaporator was 1.37 kg m$^{-2}$ h$^{-1}$.

Example 3

The preparation process is similar to that of Example 1, except that the concentration of the sodium hydroxide solution was 30 wt %, the reaction conditions were 1 h at a temperature of 25° C., the rotation speed of the centrifuge speed was 1000 rpm, and the reaction time was 30 min. The evaporation rate of the prepared evaporator was 1.56 kg m$^{-2}$ h$^{-1}$.

Example 4

The preparation process is similar to that of Example 1, except that the preparation conditions of the ball-milled biochar were 500 rpm for 7 h, the sodium hydroxide solution was used in an amount of 1000 g, and the added amount of the ball-milled biochar was 3 g. The evaporation rate of the prepared evaporator was 1.87 kg m$^{-2}$ h$^{-1}$.

Example 5

The preparation process is similar to that of Example 1, except that the selected straw powder was sorghum straw powder, the preparation conditions of the ball-milled biochar were ball milling at 300 rpm for 5 h, the concentration of the sodium hydroxide solution was 10 wt %, the amount of the sodium hydroxide solution was 200 g, and the reaction conditions were 180° C. for 5 h. The evaporation rate of the evaporator in this example was 2.12 kg m$^{-2}$ h$^{-1}$, and the photothermal conversion efficiency reaches 94.2%, which outperforms the effect reported by most of literature, indicating that most of the energy in the sunlight has been converted into steam energy.

Example 6

The preparation process is similar to that of Example 1, except that the selected straw powder was wheat straw powder, which was centrifuged at 5000 rpm for 1 min after the reaction, and the evaporation rate of the prepared evaporator was 1.98 kg m$^{-2}$ h$^{-1}$.

Figure 2:
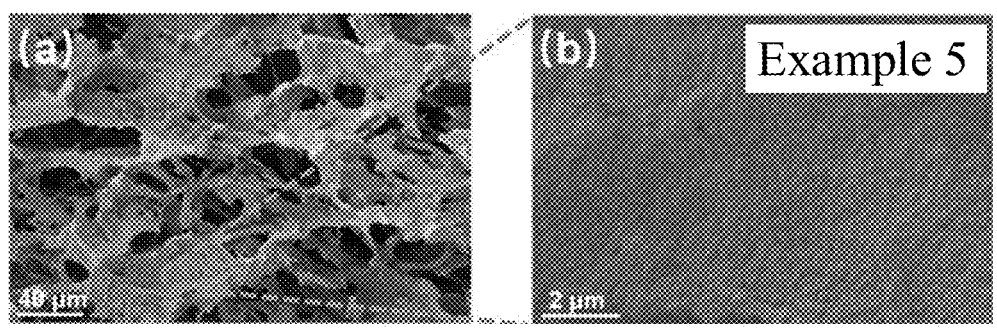
FIG. 2 is an electron microscope scanning detection diagram of an evaporator prepared according to the present disclosure.
Figure 3:
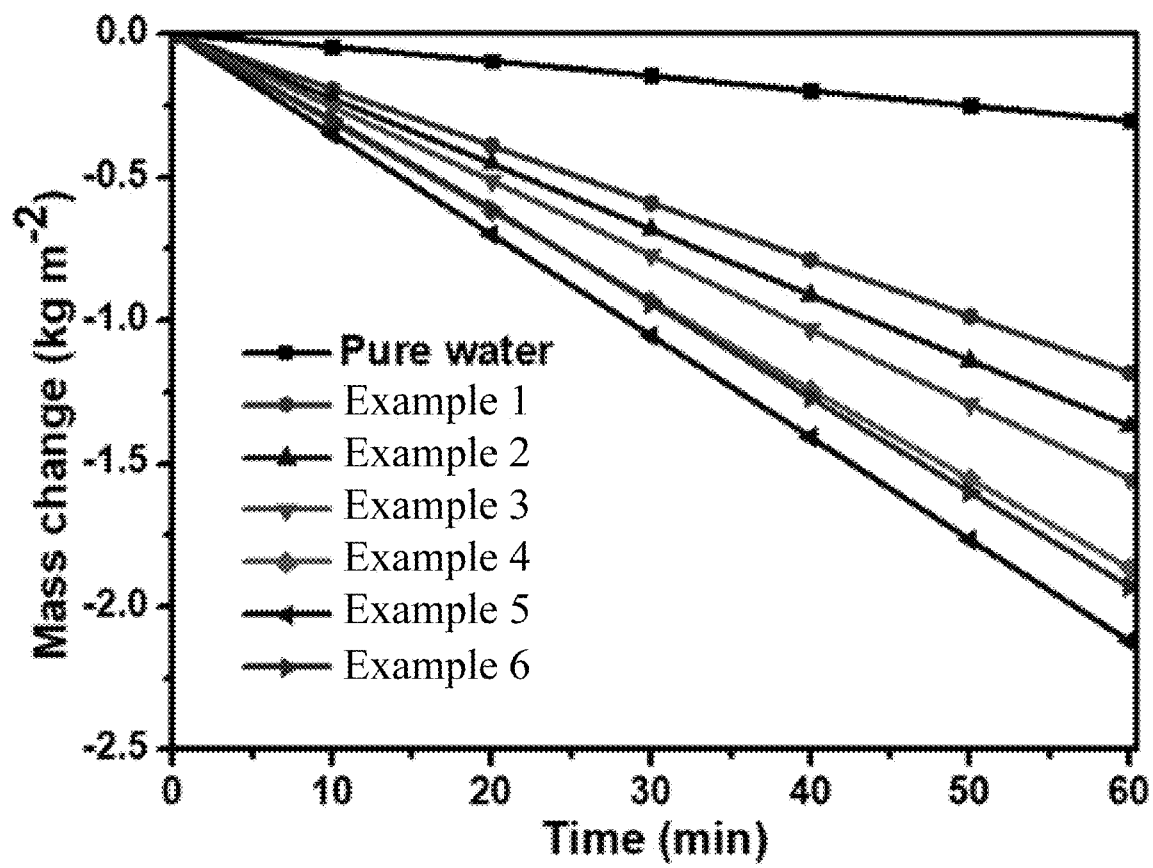
FIG. 3 is a comparison chart of evaporation rates of evaporators prepared according to the present disclosure.
Figure 4:
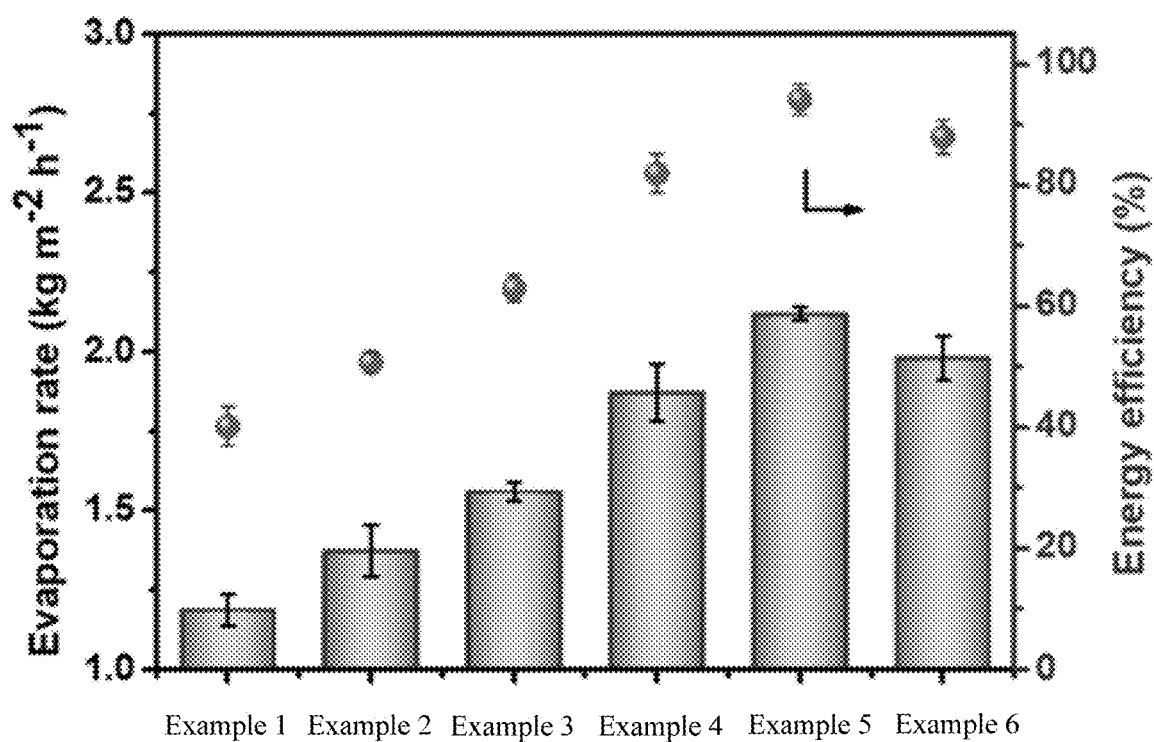
FIG. 4 is a comparison chart of evaporation rates and energy conversion efficiencies of evaporators prepared according to the present disclosure.

FIG. 1 illustrates the change of water contact angle of the evaporator prepared in Example and the water droplets completely disappeared within 0.24 s after contacting the surface of the evaporator, indicating that it was extremely hydrophilic. FIG. 2 is an electron microscope scanning detection diagram of the evaporator prepared in Example 5. The interior of the evaporator has a network structure, and it can be seen that the ball-milled biochar particles are uniformly distributed inside the evaporator, so that the excellent evaporation performance of the evaporator is guaranteed. FIG. 3 is a graph showing evaporation rates of the evaporators prepared in Examples 1-6. FIG. 4 shows evaporation rates and energy conversion efficiencies of the evaporators of Examples 1-6, and the entire evaporation experiment was conducted at a temperature of 25° C., a humidity of 60% and an optical power density of 0.1 W/cm$^2$.

What is claimed is:

1. A preparation method of a crop straw-based seawater desalinator, comprising the following steps: step 1, crushing the sorghum straw and screening the crushed straw through a 200-mesh sieve to obtain sorghum straw powder; step 2, putting the sorghum straw powder into a tube furnace, calcining the powder at a high temperature under the nitrogen protection, heating the powder rapidly up to 450° C. at a rate of 5° C./min, performing heat preservation for 5 h, cooling the power naturally down to 25° C., screening the power through a 200-mesh sieve, putting the powder into a ball milling tank, placing 42, 4 and 2 zirconia balls with diameters of 2 mm, 8 mm and 10 mm into the tank respectively, and performing ball milling in a ball mill for 5 h with a rate of 300 rpm to obtain ball-milled biochar; step 3, taking 10 g of the straw powder obtained in the step 1, adding 200 g of sodium hydroxide solution with a concentration of 10 wt % to obtain a mixture, stirring the mixture for 5 h at a temperature of 180° C. to obtain a reactant, pouring the reactant after cooling down into a centrifuge tube and centrifuging at a rotation speed of 8000 rpm for 20 min; and taking out a viscous product at the lower layer; and step 4, mixing the viscous product obtained in the step 3 with 0.1 g of the ball-milled biochar obtained in the step 2 to obtain a mixture, stirring the mixture for 10 min at a rate of 100 rpm, and uniformly shaking before being put into a mold; and finally, freezing the mixture in a refrigerator at a temperature of −4° C. for 6 h, and drying in a freeze dryer at a temperature of −80° C. for 24 h to obtain a straw-based evaporator.

2. A crop straw-based seawater desalinator obtained by the preparation method according to claim 1.

* * * * *